United States Patent
Obermann et al.

(10) Patent No.: US 12,289,072 B2
(45) Date of Patent: *Apr. 29, 2025

(54) MOTOR BRAKING USING SELECTIVELY CONNECTABLE RESISTANCE

(71) Applicant: MILWAUKEE ELECTRIC TOOL CORPORATION, Brookfield, WI (US)

(72) Inventors: Timothy R. Obermann, Waukesha, WI (US); Alexander Huber, Menomonee Falls, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/440,369

(22) Filed: Feb. 13, 2024

(65) Prior Publication Data

US 2024/0186919 A1    Jun. 6, 2024

Related U.S. Application Data

(63) Continuation of application No. 17/549,048, filed on Dec. 13, 2021, now Pat. No. 11,909,345, which is a
(Continued)

(51) Int. Cl.
*H02P 3/12* (2006.01)
*B25F 5/00* (2006.01)
(Continued)

(52) U.S. Cl.
CPC ............. *H02P 3/12* (2013.01); *B25F 5/00* (2013.01); *H02P 3/14* (2013.01); *H02P 27/08* (2013.01)

(58) Field of Classification Search
CPC ...... H02P 3/12; H02P 3/14; H02P 3/22; H02P 27/08; B25F 5/00
See application file for complete search history.

(56) References Cited

U.S. PATENT DOCUMENTS

| 1,895,379 A | 1/1933 | Dudick |
| 3,919,611 A | 11/1975 | Takahashi et al. |

(Continued)

FOREIGN PATENT DOCUMENTS

| CN | 201750384 U | 2/2011 |
| CN | 202435325 U | 9/2012 |

(Continued)

OTHER PUBLICATIONS

International Search Report and Written Opinion for Application No. PCT/US2020/036241 dated Sep. 23, 2020 (7 pages).
(Continued)

*Primary Examiner* — Bickey Dhakal
(74) *Attorney, Agent, or Firm* — Michael Best & Friedrich LLP

(57) ABSTRACT

Apparatus and method for motor braking using selectively connectable resistance. The method includes controlling, using a motor controller of the power tool, a power switching network to drive a motor of the power tool in response to actuation of a user input and determining, using the motor controller, a variable tool characteristic. The method further includes determining, using the motor controller, that the user input is de-actuated. The method also includes controlling, using the motor controller, the power switching network to brake the motor when the variable tool characteristic satisfies the tool characteristic threshold and controlling, using the motor controller, a braking circuit to brake the motor when the variable tool characteristic does not satisfy the tool characteristic threshold. The braking circuit includes one or more resistive loads and is selectively coupled to the motor terminals of the motor.

20 Claims, 6 Drawing Sheets

Related U.S. Application Data continuation of application No. 17/051,238, filed as application No. PCT/US2020/036241 on Jun. 5, 2020, now Pat. No. 11,201,572.

(60) Provisional application No. 62/859,274, filed on Jun. 10, 2019.

(51) Int. Cl.
  *H02P 3/14* (2006.01)
  *H02P 27/08* (2006.01)

(56) References Cited

U.S. PATENT DOCUMENTS

| | | |
|---|---|---|
| 5,063,319 A | 11/1991 | Mason et al. |
| 5,294,874 A | 3/1994 | Hessenberger et al. |
| 5,572,916 A | 11/1996 | Takano |
| 5,648,706 A | 7/1997 | Polk et al. |
| 5,757,154 A | 5/1998 | Peot |
| 6,037,729 A | 3/2000 | Woods et al. |
| 6,084,366 A | 7/2000 | Koselke et al. |
| 6,373,207 B1 | 4/2002 | Yablonovitch |
| 6,653,806 B1 | 11/2003 | Ono |
| 6,680,596 B1 | 1/2004 | DeCicco |
| 6,819,022 B2 | 11/2004 | Yamamoto et al. |
| 6,847,146 B2 | 1/2005 | Hessenberger et al. |
| 7,023,159 B2 | 4/2006 | Gorti et al. |
| 7,075,257 B2 | 7/2006 | Carrier et al. |
| 7,112,751 B2 | 9/2006 | Turley |
| 7,248,008 B1 | 7/2007 | Cummins |
| 7,400,106 B2 | 7/2008 | DeCicco et al. |
| 7,487,844 B2 | 2/2009 | DeCicco et al. |
| 7,511,396 B2 | 3/2009 | Sesita et al. |
| 7,537,065 B2 | 5/2009 | Gallagher et al. |
| 7,605,513 B2 | 10/2009 | Tanimoto et al. |
| 7,708,085 B2 | 5/2010 | DeCicco et al. |
| 7,861,796 B2 | 1/2011 | DeCicco et al. |
| 7,926,585 B2 | 4/2011 | Pozgay et al. |
| 8,322,456 B2 | 12/2012 | Pozgay et al. |
| 8,561,717 B2 | 10/2013 | Pozgay et al. |
| 8,766,569 B2 | 7/2014 | Suda et al. |
| 8,985,241 B2 | 3/2015 | Pozgay et al. |
| 9,475,180 B2 | 10/2016 | Eshleman et al. |
| 9,893,674 B2 | 2/2018 | Ikai et al. |
| 10,090,795 B2 | 10/2018 | Tateda |
| 10,525,579 B2 | 1/2020 | Mashiko et al. |
| 10,666,168 B2 | 5/2020 | Takeda |
| 2002/0158593 A1 | 10/2002 | Henderson et al. |
| 2008/0135268 A1 | 6/2008 | Tadokoro et al. |
| 2009/0224705 A1 | 9/2009 | Jobard et al. |
| 2012/0074878 A1 | 3/2012 | Pant et al. |
| 2012/0191250 A1 | 7/2012 | Iwata et al. |
| 2013/0207491 A1 | 8/2013 | Hatfield et al. |
| 2015/0137717 A1 | 5/2015 | Ishikawa et al. |
| 2015/0326151 A1 | 11/2015 | Ogawa |
| 2015/0330047 A1 | 11/2015 | Janssen et al. |
| 2017/0016958 A1 | 1/2017 | Saito et al. |
| 2017/0214335 A1 | 7/2017 | Basic et al. |
| 2017/0264219 A1 | 9/2017 | Takeda |
| 2017/0288583 A1 | 10/2017 | Ma et al. |
| 2017/0288584 A1* | 10/2017 | Ma .................. H02P 6/085 |
| 2017/0302211 A1 | 10/2017 | Nakamoto et al. |
| 2018/0254732 A1 | 9/2018 | Smolenaers |
| 2019/0013762 A1 | 1/2019 | Yamaguchi et al. |
| 2019/0084107 A1 | 3/2019 | Yabuguchi |
| 2021/0234481 A1 | 7/2021 | Boulanger et al. |

FOREIGN PATENT DOCUMENTS

| | | |
|---|---|---|
| CN | 103199772 A | 7/2013 |
| CN | 104816273 A | 8/2015 |
| DE | 3539841 A1 | 3/1987 |
| DE | 4022637 A1 | 1/1992 |
| DE | 4429962 A1 | 2/1996 |
| DE | 19542603 C2 | 3/1998 |
| DE | 19651298 C2 | 4/1999 |
| DE | 102011110929 A1 | 1/2013 |
| EP | 0551895 A1 | 7/1993 |
| EP | 0551896 A1 | 7/1993 |
| EP | 0551909 A1 | 7/1993 |
| EP | 0594115 A1 | 4/1994 |
| JP | S57192756 U | 12/1982 |
| JP | S6041825 Y2 | 12/1985 |
| JP | S6338700 Y2 | 10/1988 |
| JP | 2017213614 A | 12/2017 |
| KR | 101998043841 A | 9/1998 |
| KR | 20100108460 A | 10/2010 |
| KR | 20170096381 A | 8/2017 |
| WO | 2012055462 A2 | 5/2012 |
| WO | 2016031715 A1 | 3/2016 |
| WO | 2016085862 A1 | 6/2016 |

OTHER PUBLICATIONS

European Patent Office Extended Search Report for Application No. 20822325.5 dated Jan. 10, 2023 (10 pages).

* cited by examiner

MOTOR BRAKING USING SELECTIVELY CONNECTABLE RESISTANCE

RELATED APPLICATIONS

This application is a continuation of U.S. patent application Ser. No. 17/549,048, filed Dec. 13, 2021, which is a continuation of U.S. patent application Ser. No. 17/051,238, filed Oct. 28, 2020, now U.S. Pat. No. 11,201,572, which is a national phase filing under 35 U.S.C. § 371 of International Application No. PCT/US2020/036241, filed on Jun. 5, 2020, which claims the benefit of U.S. Provisional Patent Application No. 62/859,274, filed on Jun. 10, 2019, the entire content of each of which is hereby incorporated by reference.

FIELD

Embodiments described herein relate to a motor braking circuit for braking motors in a power tool.

BACKGROUND

Some power tools include braking control to bring the motor to a stop after the trigger is released. To meet certain industry standards, the motor may need to come to a complete stop within a set time period (for example, a prescribed time). Some power tools include a large, high-cost braking resistor that absorbs the resultant energy in the motor during braking of the motor.

SUMMARY

A large resistor used for braking produces excess heat that is concentrated at one location when the braking resistor absorbs the excess current in the motor. The resistor and the components used to dissipate heat from the system add to the cost of manufacturing the power tool. Accordingly, at least some embodiments described herein provide improved techniques for braking the motor that reduce costs of the power tool, improve heat management for the power tool, and provide additional space-saving layout options for the power tool.

Some embodiments provide a power tool including a power source, a motor, a power switching network connected between the power source and the motor, a user input configured to be actuated to drive the motor. The power tool further includes a braking circuit including one or more resistive loads and configured to be selectively coupled to motor terminals of the motor and a motor controller connected to the power switching network and the braking circuit. The motor controller is configured to control the power switching network to drive the motor in response to actuation of the user input and determine a variable tool characteristic. The motor controller is further configured to determine that the user input is de-actuated and determine whether the variable tool characteristic satisfies a tool characteristic threshold in response to the user input being de-actuated. The motor controller is also configured to control the power switching network to brake the motor when the variable tool characteristic satisfies the tool characteristic threshold and control the braking circuit to brake the motor when the variable tool characteristic does not satisfy the tool characteristic threshold.

The motor may be a three phase motor including three motor terminals. The one or more resistive loads of the braking circuit may include three resistive loads, one for each of the three motor terminals.

The braking circuit may also include one or more braking switches and the motor controller controls the one or more braking switches to selectively couple the one or more resistive loads to the motor terminals. The one or more braking switches may include field effect transistors (FETs) controlled by the motor controller. The motor controller may perform a pulse width modulated (PWM) control of the one or more braking switches to brake the motor. The braking circuit is configured to selectively couple the motor terminals to each other, selectively couple the motor terminals to ground, or selectively couple the motor terminals to a terminal of the power source.

The variable tool characteristic may be a system impedance and the variable tool characteristic satisfies the tool characteristic threshold when the system impedance is above a system impedance threshold.

The variable tool characteristic may be a motor current and the variable tool characteristic satisfies the tool characteristic threshold when the motor current is below a regenerative braking threshold.

The motor controller may be further configured to determine that the motor current has decreased below the regenerative braking threshold when braking the motor using the braking circuit and switch from controlling the braking circuit to brake the motor to controlling the power switching network to brake the motor in response to determining that the motor current has decreased below the regenerative braking threshold.

The motor controller may be further configured to perform a regenerative braking using the power switching network to redirect braking current to the power source.

The power tool may include a straight connect power interface such that a connection between the power source and the power switching network is provided without an on/off switch controlled by a trigger of the power tool. In some instances, the connection between the power source and the power switching network is provided without a mechanical on/off switch and/or without an electrical solid-state switching device.

Some embodiments provide a method for braking a motor of a power tool including controlling, using a motor controller of the power tool, a power switching network to drive a motor of the power tool in response to actuation of a user input and determining, using the motor controller, a variable tool characteristic. The method further comprises determining, using the motor controller, that the user input is de-actuated and determining, using the motor controller, whether the variable tool characteristic satisfies a tool characteristic threshold in response to the user input being de-actuated. The method also includes controlling, using the motor controller, the power switching network to brake the motor when the variable tool characteristic satisfies the tool characteristic threshold and controlling, using the motor controller, a braking circuit to brake the motor when the variable tool characteristic does not satisfy the tool characteristic threshold. The braking circuit having one or more resistive loads is selectively coupled to motor terminals of the motor.

Selectively coupling the braking circuit to the motor terminals may further include controlling, using the motor controller, one or more braking switches to couple the one or more resistive loads to the motor terminals. The method may also include performing, using the motor controller, a PWM control of the one or more braking switches to brake the motor using the braking circuit.

The method may include performing, using the power switching network, a regenerative braking to redirect braking current to the power source when braking the motor using the power switching network.

Other aspects of the invention will become apparent by consideration of the detailed description and accompanying drawings.

Figure 1:
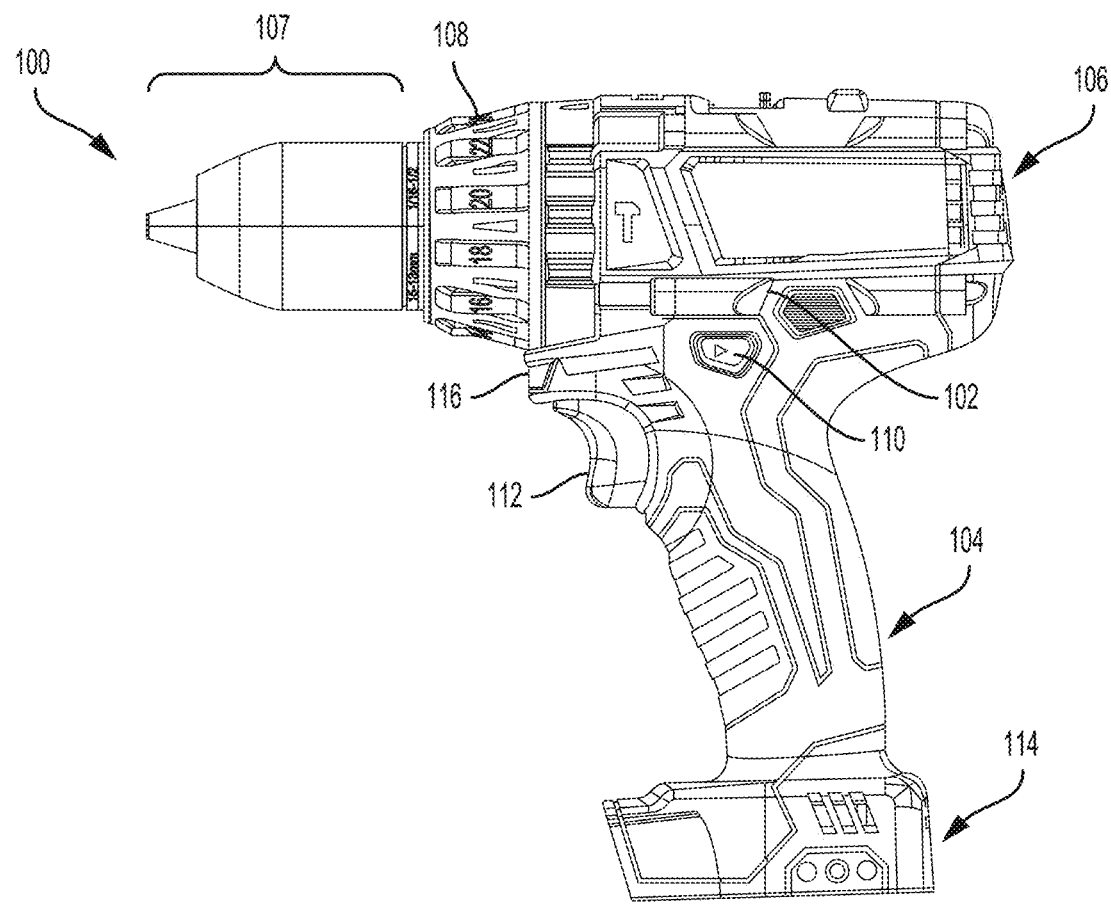
FIG. 1 illustrates a side view of a power tool in accordance with some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

DETAILED DESCRIPTION

FIG. 1 illustrates a power tool 100 incorporating a brushless direct current (DC) motor. In a brushless motor power tool, such as power tool 100, switching elements are selectively enabled and disabled by control signals from a controller to selectively apply power from a power source (e.g., battery pack) to drive a brushless motor. The power tool 100 is a brushless hammer drill having a housing 102 with a handle portion 104 and motor housing portion 106. The power tool 100 further includes an output driver 107 (illustrated as a chuck), torque setting dial 108, forward/reverse selector 110, trigger 112, battery interface 114, and light 116. Although FIG. 1 illustrates a hammer drill, in some embodiments, the motors described herein are incorporated into other types of power tools including drill-drivers, impact drivers, impact wrenches, angle grinders, circular saws, reciprocating saws, string trimmers, leaf blowers, vacuums, and the like.

Figure 2:
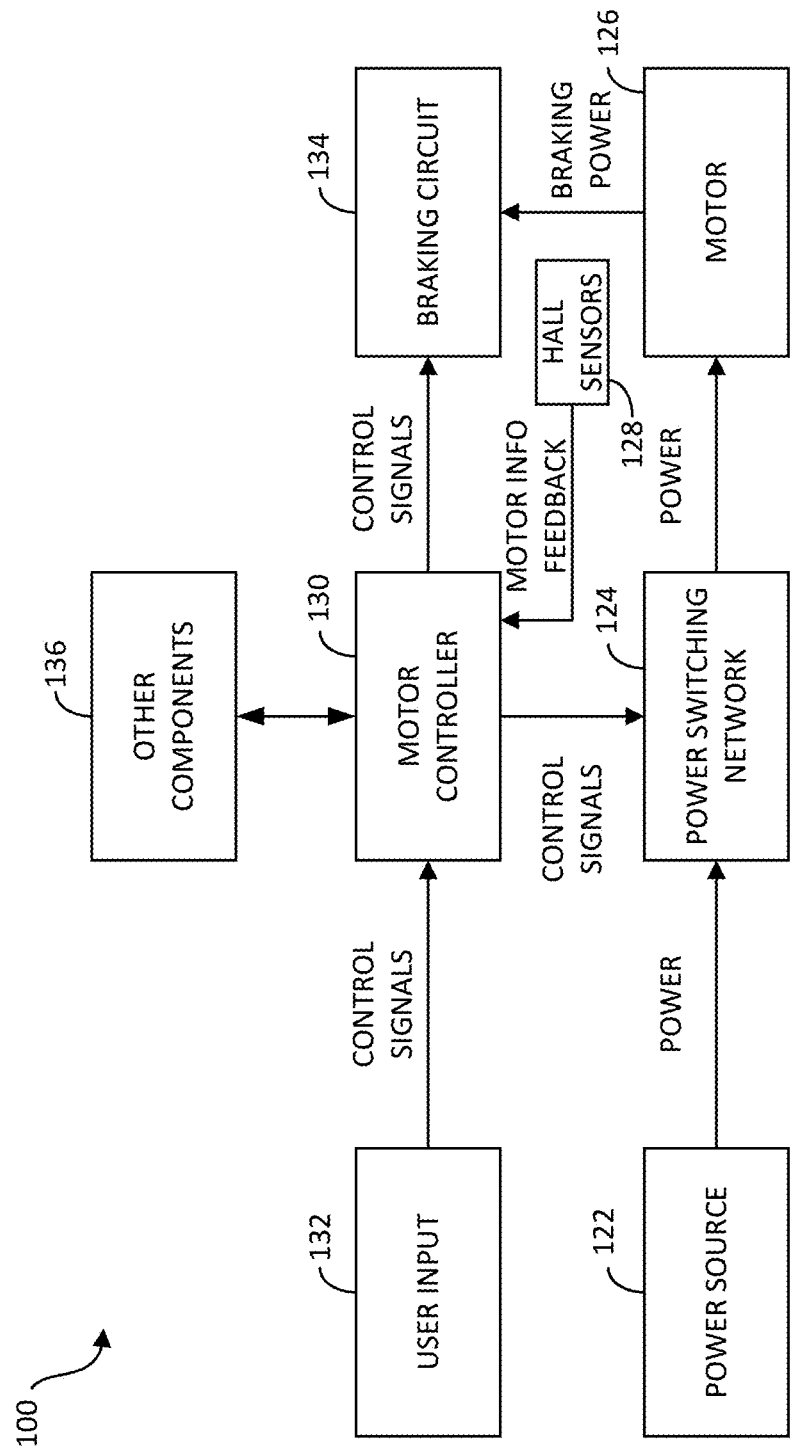
FIG. 2 illustrates a block diagram of the power tool of FIG. 1 in accordance with some embodiments.

FIG. 2 illustrates a simplified block diagram of the brushless power tool 100, which includes a power source 122, a power switching network 124, a motor 126, Hall sensors 128, a motor controller 130, user input 132, a braking circuit 134, and other components 136 (battery pack fuel gauge, work lights (LEDs), current/voltage sensors, etc.). The power source 122 provides DC power to the various components of the power tool 100 and may be a power tool battery pack that is rechargeable and uses, for instance, lithium ion cell technology. In some instances, the power source 122 may receive AC power (e.g., 120V/60 Hz) from a tool plug that is coupled to a standard wall outlet, and then filter, condition, and rectify the received power to output DC power. Each Hall sensor 128 outputs motor feedback information, such as an indication (e.g., a pulse) when a magnet of the rotor rotates across the face of that Hall sensor 128. Based on the motor feedback information from the Hall sensors 128, the motor controller 130 can determine the position, velocity, and acceleration of the rotor. The motor controller 130 also receives user controls from user input 132, such as by depressing the trigger 112 or shifting the forward/reverse selector 110. In response to the motor feedback information and user controls, the motor controller 130 transmits control signals to the power switching network 124 to drive the motor 126, as explained in further detail with respect to FIGS. 3A and 3B. In some embodiments, the power tool 100 may be a sensorless power tool that does not include a Hall sensor 128 or other position sensor to detect the position of the rotor. Rather, the rotor position may be detected based on the inductance of the motor 126 or the back emf generated in the motor 126. Although not shown, the motor controller 130 and other components of the power tool 100 are electrically coupled to the power source 122 such that the power source 122 provides power thereto.

Figure 3A:
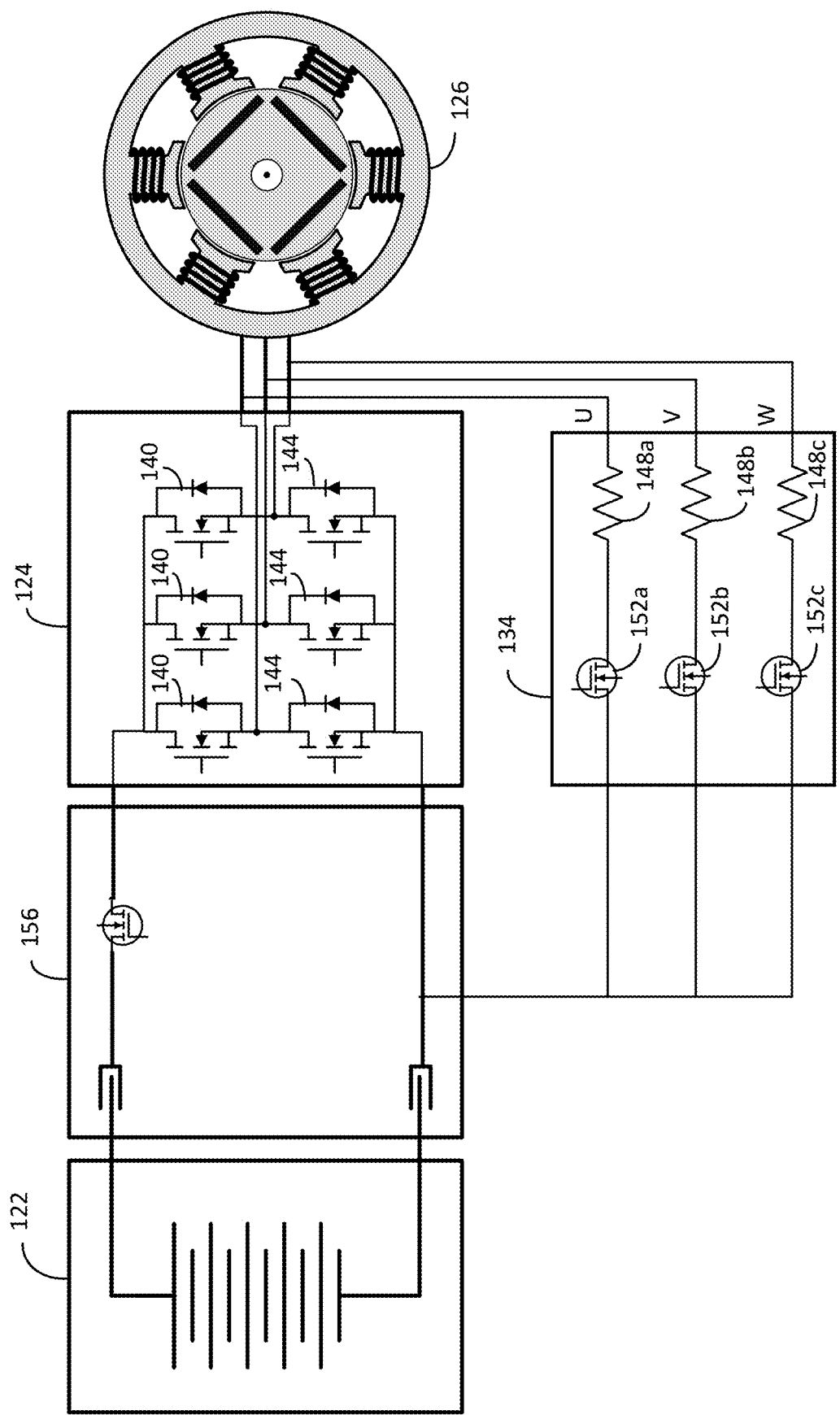
FIGS. 3A and 3B illustrate a block diagram of a power switching network and a braking circuit of the power tool of FIG. 1 in accordance with some embodiments.
Figure 3B:
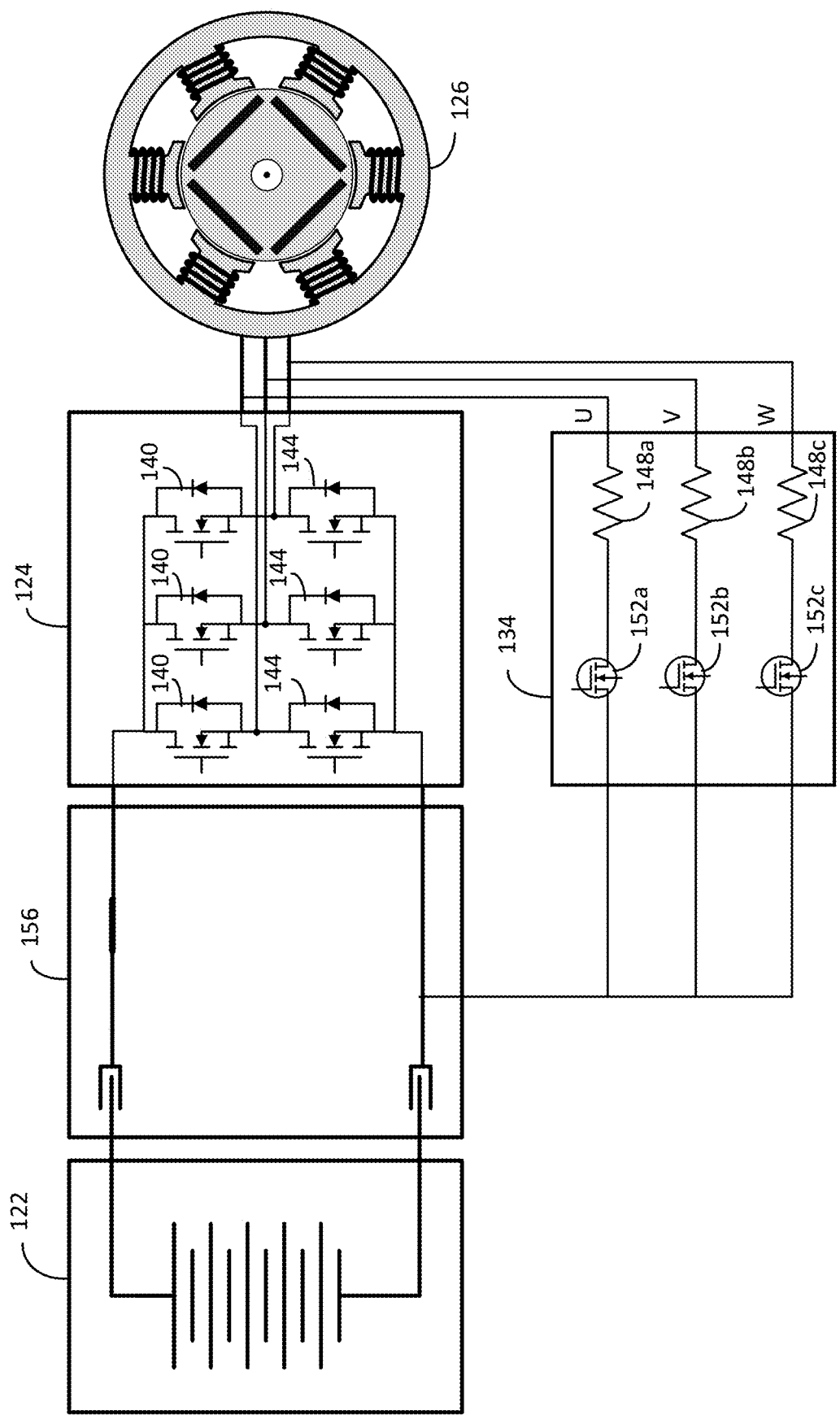

FIGS. 3A and 3B illustrate a circuit diagram of the power switching network 124 and the braking circuit 134. The power switching network 124 includes a plurality of high side power switching elements 140 (e.g., field effect transistors [FETs]) and a plurality of low side power switching elements 144 (e.g., FETs). The braking circuit 134 includes a plurality of braking resistors 148 (individually, 148a, 148b, 148c) and a plurality of braking switching elements 152 (individually, 152a, 152b, 152c), which are, for example, braking field effect transistors (FETs). The motor controller 130 provides the control signals to control the high side FETs 140 and the low side FETs 144 to drive the motor based on the motor feedback information and user controls, as noted above. For example, in response to detecting a pull of the trigger 112 and the input from forward/reverse selector 110, the motor controller 130 provides the control signals to selectively enable and disable the FETs 140 and 144 (e.g., sequentially, in pairs) resulting in power from the power source 122 to be selectively applied to stator coils of the motor 126 to cause rotation of a rotor. More particularly, to drive the motor 126, the motor controller 130 enables a first high side FET 140 and first low side FET 144 pair (e.g., by providing a voltage at a gate terminal of the FETs) for a first period of time. In response to determining that the rotor of the motor 126 has rotated based on a pulse from the Hall sensors 128, the motor controller 130 disables the first FET pair, and enables a second high side FET 140 and a second low side FET 144. In response to determining that the rotor of the motor 126 has rotated based on pulse(s) from the Hall sensors 128, the motor controller 130 disables the second FET pair, and enables a third high side FET 140 and a third low side FET 144. In response to determining that the rotor of the motor 126 has rotated based on further pulse(s) from the Hall sensors 128, the motor controller 130 disables the third FET pair and returns to enable the first high side FET 140 and the third low side FET 144. This sequence of cyclically enabling pairs of high side FET 140 and a low side FET 144 repeats to drive the motor 126. Further, in some embodiments, the control signals include pulse width modulated (PWM) signals having a duty cycle that is set in proportion to the amount of trigger pull of the trigger 112, to thereby control the speed or torque of the motor 126.

To stop the motor 126, the motor controller 130 shorts the low side FETs 144 (i.e., enables the low side FETs 144 and disables the high side FETs 140) to allow the back EMF to flow through the motor coils of the motor 126. The back EMF provides a braking force on the magnets of the rotor. For power tools 100 in which it may be desirable to have a faster stopping of the motor 126 (e.g., saws, grinders, and the like), additional resistance is used to brake the motor 126. As illustrated in FIGS. 3A and 3B, the motor controller 130 controls the braking switching elements 152 to close thereby connecting the plurality of braking resistors 148 to the current path of the motor 126. The plurality of braking resistors 148 absorb the excess current and bring the motor 126 to a faster stop in comparison to a power tool 100 without the braking circuit 134.

In the example illustrated in FIGS. 3A and 3B, the braking circuit 134 includes three resistors 148, one for each terminal (U, V, and W) of the motor 126. The braking resistors 148 are selectively connected to the respective motor terminals by controlling braking switching elements 152. The motor controller 130 provides the control signals to control braking switching elements 152 to brake the motor. For example, in response to detecting a release of the trigger 112, the motor controller 130 provides control signals to selectively enable the braking switching elements 152 resulting in the remaining power in the motor 126, or at least a significant portion thereof, being absorbed by the braking resistors 148. In the braking circuit 134, the excess current from the motor 126 is directed to ground or a negative terminal of the power source 122 rather than back into the motor 126. Additionally, the braking circuit 134 is provided separate from the power switching elements 140, 144 to brake the motor 126 without using the power switching elements 140, 144.

In some embodiments, the braking circuit 134 shorts the motor terminals. For example, the braking switches 152 couple the braking resistors 148 between the motor terminals such that when the braking switches 152 are enabled, power flow in the motor terminals is absorbed by the braking resistors 148.

In some embodiments, the motor controller 130 may implement a PWM control of the braking switching elements 152 to brake the motor 126. The motor controller 130 selectively activates the braking switching elements 152 to direct the current from the motor coils into the braking resistors 148.

One advantage of the using multiple resistors 148 as provided in FIGS. 3A and 3B includes avoiding high-cost, large resistors. Additionally, the heat from the resistors 148 is dissipated over a larger area within the power tool 100 resulting in low heat density caused by the braking.

In the example illustrated in FIG. 3A, the power tool 100 includes a straight connect power interface 156. That is, a connection between the power source 122 and the power switching network 124 is provided without a mechanical on/off switch that is controlled by the trigger 112 of the power tool 100. Typically, power tools may include mechanical switch, for example, a relay or a solid state drive switch coupled on the current path between the power source 122 and the power switching network 124. The mechanical switch is used to enable or disable power from the power source 122 to the power switching network 124 and is controlled mechanically by the trigger 112. Rather than a mechanical switch mechanically controlled by the trigger 112, the power tool 100 may not include a mechanical switch and, instead, for example, may include a FET 158 controlled by the motor controller 130 to selectively connect and disconnect the power source 122 to the power switching network 124 (e.g., based on trigger pull). In some embodiments, the straight connection power interface 156 does not include a mechanical switch or an electrical solid-state switching device (as shown in FIG. 3B), that is, the FET 158 such that the power is provided straight from the battery pack to the power switching network 124. Particularly, the straight connection power interface 156 without a mechanical or electrical switch is, in some embodiments, an advantage of providing the braking circuit 134. When the FET 158 is removed to form the straight connection power interface 156, braking switching elements 152 are used to brake the motor while not connecting a low-impedance across the power source 122. The functions of the mechanical relay or FET 158 may therefore be performed by the braking switching elements 152.

Figure 4:
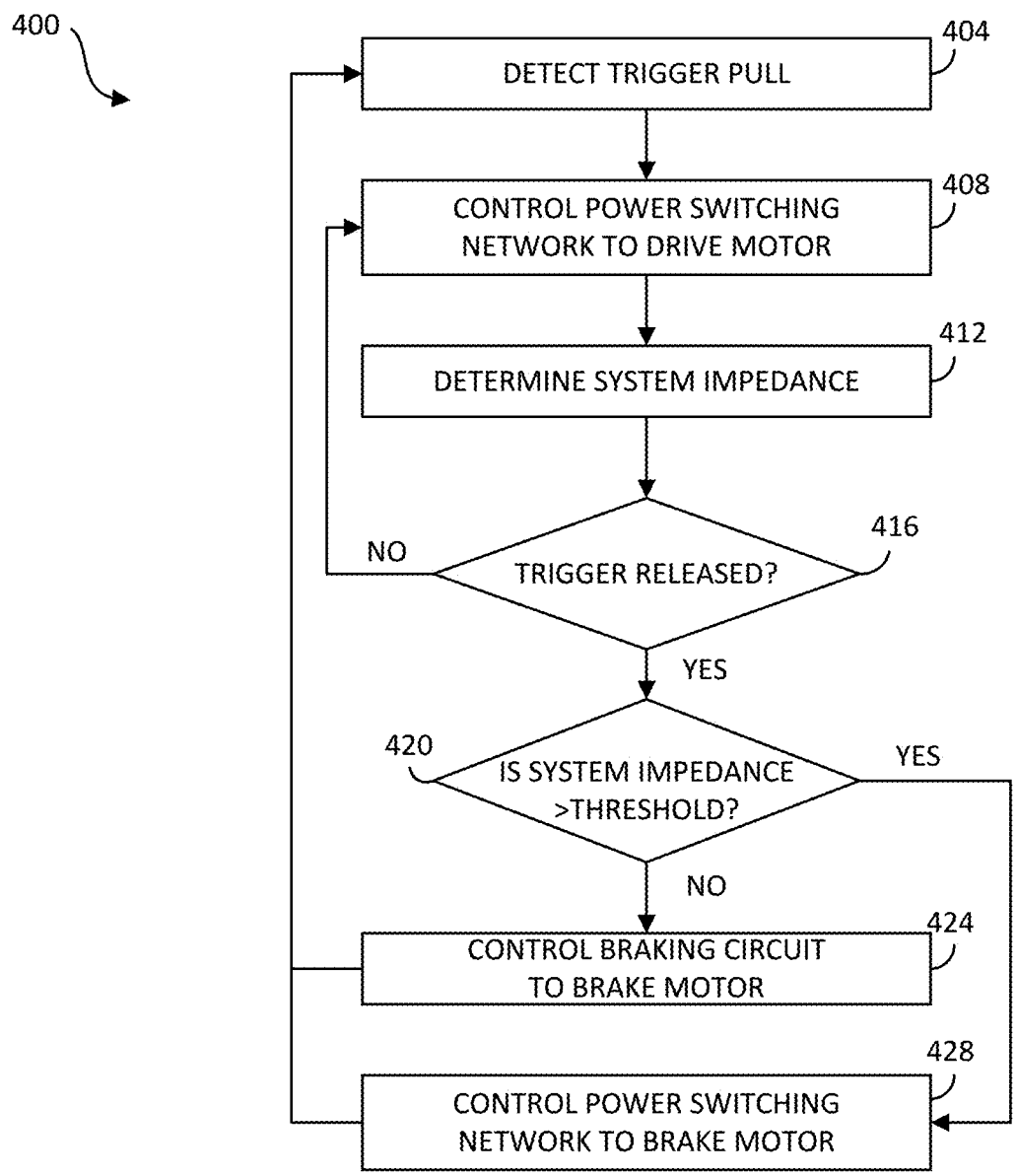
FIG. 4 is a flowchart of a method of braking a motor of the power tool of FIG. 1 in accordance with some embodiments.

FIG. 4 is a flowchart of an example method 400 for braking the motor 126 of the power tool 100. In the example illustrated, the method 400 includes detecting, using the motor controller 130, a trigger pull (at block 404). When the trigger 112 is pulled, the motor controller 130 receives an input from the user input 132 indicating that the trigger 112 is pulled. For example, a trigger sensor (e.g., a push button switch, a Hall sensor, a potentiometer, or force sensor) may detect trigger depression and output a signal indicative of the pull state (e.g., pulled or not pulled) to the motor controller 130. In some embodiments, the motor controller 130 may also receive an input indicating the distance to which the trigger is pulled indicating a desired speed for variable speed control of the motor.

The method 400 includes controlling, using the motor controller 130, the power switching network 124 to drive the motor 126 (at block 408). The power switching network 124 includes the plurality of high side power switching elements 140 and the plurality of low side power switching elements 144. The motor controller 130 provides the control signals to control the high side FETs 140 and the low side FETs 144 to drive the motor 126 based on the motor feedback information and user controls, as noted above.

The method 400 also includes determining, using the motor controller 130, a system impedance (at block 412). The motor controller 130 may detect the impedance of the motor 126 and/or the power switching network 124. In one example, a motor impedance is measured through simulation and/or experimentation during manufacturing and saved in a memory of the motor controller 130. The motor controller 130 determines the system impedance, including the battery and/or source impedance, by communicating with the power source 122 (for example, a battery pack controller of the power source 122) to retrieve the power source impedance or by measuring an impedance of the power source 122 using voltage and/or current sensors. The system impedance is then determined based on the power source impedance and the motor impedance. Typically, motor braking is more effective when the system impedance is higher. However, at low speed or low torque operations, the system (e.g., the motor 126 and/or the power switching network 124) may not have enough impedance to bring the motor to a stop within the prescribed stopping time. Therefore, in some embodiments, the motor controller 130 continuously determines and keeps track of the impedance of the system.

The method 400 includes determining, using the motor controller 130, whether the trigger 112 is released (at block 416). When the trigger 112 is released, the motor controller 130 receives an input from the trigger sensor of the user input 132 indicating that the trigger 112 is released. The motor controller 130 determines the trigger release state based on the input from the user input 132. The method 400 continues to drive the motor when the trigger 112 is not released.

When the trigger 112 is released, the method 400 includes determining, using the motor controller 130, whether the system impedance is greater than or equal to an impedance threshold (at block 420). When the input from the user input 132 indicates that the trigger is released, the motor controller 130 determines whether the system impedance is sufficient to brake the motor 126. In some embodiments, the motor controller 130 may determine the system impedance after the trigger 112 is released.

When the system impedance is not greater than or equal to the impedance threshold, the method 400 includes controlling, using the motor controller 130, the braking circuit 134 to brake the motor 126 (at block 424). For example, the motor controller 130 may enable the braking switching elements 152 to connect the braking resistors 148 to the motor terminals (U, V, and W). The braking resistors 148 absorb the current in the motor 126 and bring the motor to a stop within the prescribed stopping time. The value of the resistance used for the braking resistors 148 is selected based on the prescribed stopping time. For example, the smaller the stopping time, the larger the resistance value of the braking resistors 148 chosen. In some embodiments, the motor controller 130 uses the braking circuit 134 to brake the motor 126 even when the system impedance is sufficient to brake the motor 126 (for example, blocks 420 and 424 are bypassed). When the braking circuit 134 is used to brake the motor 126, the motor current flows through the braking resistors 148 to ground or to the negative terminal of the power source 122. Alternatively, the braking circuit 134 forms a closed circuit with the motor terminals (U, V, and W) such that the motor current flows through the braking resistors 148.

When the system impedance is greater than or equal to the impedance threshold, the method 400 includes controlling, using the motor controller 130, the power switching network 124 to brake the motor 126 (at block 428). The motor controller 130 selectively enables, for example, the low side FETs 144 to direct the current from the motor 126 to ground or negative terminal of the power source 122. In some embodiments, the motor controller 130 may direct the motor current, for example, through a freewheeling diode of the high side FETs 140 to the power source 122 to charge the power source 122 using the braking current. The method 400 repeats to determine the next trigger pull of the power tool 100.

Figure 5:
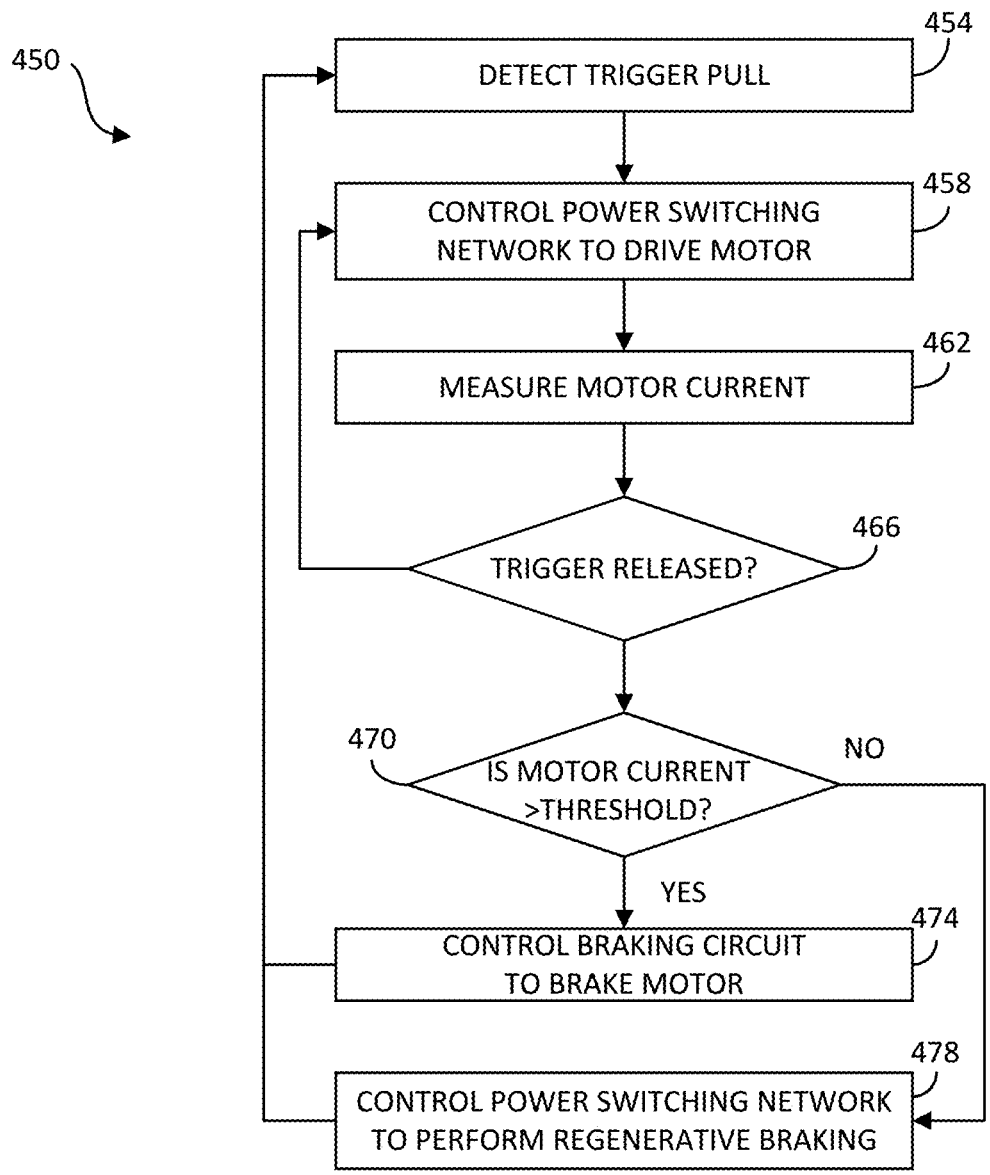
FIG. 5 is a flowchart of a method of braking a motor of the power tool of FIG. 1 in accordance with some embodiments.

FIG. 5 is a flowchart of an example method 450 for braking the motor 126 of the power tool 100. In the example illustrated, the method 450 includes detecting, using the motor controller 130, a trigger pull (at block 454). As described above, a trigger sensor of the user input 132 may provide an indication of a trigger pull to the motor controller 130. The method 450 includes controlling, using the motor controller 130, the power switching network 124 to drive the motor 126 (at block 458). The motor controller 130 provides the control signals to control the high side FETs 140 and the low side FETs 144 to drive the motor 126 based on the motor feedback information and user controls, as noted above.

The method 450 also includes determining, using the motor controller 130, a motor current (at block 462). The motor controller 130 may detect the amount of current flowing through the motor 126 using a current sensor to determine the torque of the motor 126. During regenerative braking, the current generated by the rotor magnets in the motor 126 is directed to the power source 122, for example, to charge the power source 122. However, excess current flow to the power source 122 may damage the power source 122 or other electrical components of the power tool 100. Therefore, in some embodiments, the motor controller 130 continuously determines and keeps track of the motor current of motor torque for regenerative braking.

The method 450 includes determining, using the motor controller 130, whether the trigger 112 is released (at block 466). The motor controller 130 determines the trigger release state based on the input from the trigger sensor of the user input 132. The method 450 continues to drive the motor 126 when the trigger 112 is not released.

When the trigger 112 is released, the method 450 includes determining, using the motor controller 130, whether the motor current is greater than or equal to a regenerative current threshold (at block 470). When the input from the user input 132 indicates that the trigger 112 is released, the motor controller 130 determines whether the motor current or motor torque is greater than or equal to a regenerative current threshold (e.g., via a comparison operation). The regenerative current threshold may be selected as the current that can safely be used to charge the power source 122 during braking of the motor 126. In some embodiments, the motor controller 130 may determine the motor current or torque after the trigger 112 is released.

When the motor current is greater than the regenerative current threshold, the method 450 includes controlling, using the motor controller 130, the braking circuit 134 to brake the motor 126 (at block 474). For example, the motor controller 130 may enable the braking switching elements 152 to connect the braking resistors 148 to the motor terminals (U, V, and W). The braking resistors 148 absorb the current in the motor 126 and bring the motor 126 to a stop within the prescribed stopping time. In some embodiments, the motor controller 130 uses the braking circuit 134 to brake the motor 126 even when the motor current is below the regenerative current threshold. When the braking circuit 134 is used to brake the motor 126, the motor current flows through the braking resistors 148 to ground or to the negative terminal of the power source 122. Alternatively, the braking circuit 134 forms a closed circuit with the motor terminals (U, V, and W) such that the motor current flows through the braking resistors 148.

When the motor current is not greater than the regenerative current threshold, the method 450 includes controlling, using the motor controller 130, the power switching network 124 to perform regenerative braking of the motor 126 (at block 478). The motor controller 130 selectively enables, for example, one of the low side FETs 144 to enable a freewheeling current, induced by the still-rotating rotor magnets, to flow through the enabled low side FET 144 (e.g., 144a), coupled windings of a motor coil phase, and a freewheeling diode of a coupled, adjacent low side FET 144 (e.g., 144b). The freewheeling current is stored in part as potential energy within the motor coil windings (i.e., voltage) coupled between the adjacent low side FETs 144. The motor controller 130 then disables the previously enabled low side FET 144, which directs the stored potential energy to flow as current through a high side FET 140 to the power source 122 to charge the power source 122. The method 450 repeats in that the motor controller 130 returns to block 454 to determine the next trigger pull of the power tool 100.

In some embodiments, when the motor current is above the regenerative current threshold in block 470, the motor controller 130 brakes the motor in block 474 momentarily and then loops back to block 470 determine whether the motor current has decreased below the regenerative current threshold. The motor controller 130 continuously loops between blocks 470 and 474 until the motor current drops below the regenerative current threshold, and the motor controller then proceeds to block 478.

The above design allows for using a one-third (⅓) of the size of the resistors used in previous designs relying on a single, large braking resistor. Additionally, the size of the braking transistors (FETs) used in the braking circuit 134 may be smaller than a braking FET used with a single, large braking resistor, due to the braking current being spread out among multiple current paths and not concentrated on a single braking FET and resistor pair. Further, additional redundancy can be achieved, for example, when one of the braking switching elements 152 fails such that the other braking resistors 148 in the working paths may be used to brake the motor 126.

While the illustrated braking circuit 134 of FIGS. 3A and 3B includes three braking current paths (i.e., through the three braking FETs 152 and associated three braking resistors 148, one pair for each motor phase), in some embodiments, the braking circuit 134 includes only two braking current paths (i.e., through two braking FETS 152 and associated braking resistors 148) along just two of the three motor phases.

In some embodiments, blocks 420 of FIG. 4 and 470 of FIG. 5 may be more generally described as blocks in which the motor controller 130 determines whether to initiate enhanced braking using the motor braking circuit 134 based on a variable tool characteristic. In the case of block 420 of FIG. 4, the variable tool characteristic is motor impedance, and the motor controller 130 determines to initiate enhanced braking in response to the motor impedance being greater than an impedance threshold. In the case of block 470 of FIG. 5, the variable tool characteristic is motor current, and the motor controller 130 determines to initiate enhanced braking in response to the motor current being greater than a regenerative current threshold.

Thus, various embodiments described herein provide for a motor braking circuit for a power tool motor.

We claim:

1. A power tool comprising:
    a battery pack;
    a three-phase motor including three motor terminals;
    a power switching network coupled between the battery pack and the motor, wherein the power switching network includes a first power switching element and a second power switching element;
    a user input configured to be actuated to drive the motor;
    a braking circuit including a resistor and a braking switching element connected to each motor terminal, wherein each braking switching element is configured to selectively connect a respective resistor to a respective motor terminal, and wherein the braking circuit is configured to selectively couple each motor terminal to one selected from the group consisting of ground and a terminal of the battery pack; and
    a motor controller connected to the power switching network and the braking circuit and configured to:
        control the power switching network to drive the motor in response to actuation of the user input,
        determine a variable tool characteristic,
        determine that the user input is de-actuated,
        determine whether the variable tool characteristic satisfies a tool characteristic threshold in response to the user input being de-actuated,
        in response to the variable tool characteristic satisfying the tool characteristic threshold:
            control the power switching network to brake the motor,
            enable the first power switching element to induce a freewheeling current to flow through the first power switching element, wherein the freewheeling current flows through a diode of the second power switching element, and
            disable the first power switching element to provide the freewheeling current to the battery pack, and
        control the braking circuit to brake the motor when the variable tool characteristic does not satisfy the tool characteristic threshold.

2. The power tool of claim 1, wherein the braking switching element includes a Field Effect Transistor (FET) configured to be controlled by the motor controller.

3. The power tool of claim 1, wherein the motor controller is configured to:
    perform a pulse width modulation control of the braking switching element to brake the motor using the braking circuit.

4. The power tool of claim 1, wherein, to control the braking circuit to brake the motor, the motor controller is configured to:
    control each braking switching element to couple the respective resistor to the respective motor terminal.

5. The power tool of claim 4, wherein, when the braking circuit is coupled to the motor terminals, the braking circuit forms a closed circuit with the motor terminals and the motor current flows through the resistors.

6. The power tool of claim 1, further comprising:
    a straight connect power interface such that a connection between the battery pack and the power switching network is provided without an on/off switch controlled by the user input.

7. The power tool of claim 1, wherein the motor controller is further configured to:
    determine that the variable tool characteristic has decreased below the regenerative braking threshold when braking the motor using the braking circuit; and
    switch from controlling the braking circuit to brake the motor to controlling the power switching network to brake the motor in response to the variable tool characteristic having decreased below the regenerative braking threshold.

8. The power tool of claim 1, wherein a resistance value of the one or more resistive loads is selected based on a prescribed stopping time.

9. A method for braking a three-phase motor of a power tool, the method comprising:
controlling, using a motor controller of the power tool, a power switching network to drive the motor of the power tool in response to actuation of a user input, wherein the power switching network includes a first power switching element and a second power switching element;
determining, using the motor controller, a variable tool characteristic;
determining, using the motor controller, that the user input is de-actuated;
determining, using the motor controller, whether the variable tool characteristic satisfies a tool characteristic threshold in response to the user input being de-actuated;
in response to the variable tool characteristic satisfying the tool characteristic threshold:
controlling, using the motor controller, the power switching network to brake the motor,
enabling, using the motor controller, the first power switching element to induce a freewheeling current to flow through the first power switching element, wherein the freewheeling current flows through a diode of the second switching element, and
disabling, using the motor controller, the first power switching element to provide the freewheeling current to a battery pack connected to the power tool; and
controlling, using the motor controller, a braking circuit to brake the motor in response to the variable tool characteristic not satisfying the tool characteristic threshold, the braking circuit including a respective resistor and a respective braking switching element connected to a respective terminal of the motor, and wherein each respective braking switching element is configured to selectively couple the respective resistor to the respective terminal of the motor.

10. The method of claim 9, wherein selectively coupling the respective resistor to the respective terminal of the motor further comprises:
controlling, using the motor controller, each respective braking switching element to couple the respective resistor to the respective terminal of the motor.

11. The method of claim 10, wherein, when the braking circuit is coupled to the motor terminals, the braking circuit forms a closed circuit with the motor terminals and the motor current flows through the resistors.

12. The method of claim 9, further comprising:
performing, using the motor controller, a pulse width modulation control of the braking switching elements to brake the motor using the braking circuit.

13. The method of claim 9, further comprising:
determining, using the motor controller, that the variable tool characteristic has decreased below the regenerative braking threshold when braking the motor using the braking circuit; and
switching from controlling the braking circuit to brake the motor to controlling the power switching network to brake the motor in response to determining that the variable tool characteristic has decreased below the regenerative braking threshold.

14. A method for braking a motor of a power tool, the method comprising:
controlling, in response to actuation of a user input, a power switching network to drive the motor, wherein the power switching network is coupled between a power source and the motor;
determining a variable tool characteristic;
determining that the user input is de-actuated;
determining, in response to the user input being de-actuated, whether the variable tool characteristic satisfies a tool characteristic threshold;
controlling, in response to the variable tool characteristic satisfying the tool characteristic threshold, the power switching network to brake the motor; and
controlling, in response to the variable tool characteristic not satisfying the tool characteristic threshold, a braking circuit to brake the motor, the braking circuit including one or more resistive loads, the braking circuit configured to be selectively coupled to motor terminals of the motor, the braking circuit configured to selectively couple the motor terminals to one selected from the group consisting of ground and a terminal of the power source,
wherein the variable tool characteristic is a system impedance, and
wherein the variable tool characteristic satisfies the tool characteristic threshold when the system impedance is above a system impedance threshold.

15. The method of claim 14, wherein the braking circuit includes one or more braking switches, the method further comprising:
controlling the braking circuit by controlling the one or more braking switches to selectively couple one or more braking resistors to the motor terminals.

16. The method of claim 15, further comprising:
controlling the braking circuit by performing a pulse width modulation control of the one or more braking switches to brake the motor.

17. The method of claim 14, wherein controlling the power switching network to brake the motor includes performing a regenerative braking using the power switching network to redirect braking current to the power source.

18. The method of claim 17, wherein performing regenerative braking includes selectively enabling a low-side Field Effect Transistor (FET) of the power switching network to enable a freewheeling current.

19. The method of claim 14, wherein the system impedance includes a power source impedance, the method further comprising:
measuring the power source impedance using a voltage sensor and a current sensor.

20. The method of claim 14, wherein the system impedance includes a power source impedance, the method further comprising:
retrieving the power source impedance by communicating with the power source.

* * * * *